United States Patent [19]

Le Creff et al.

[11] Patent Number: 4,562,309
[45] Date of Patent: Dec. 31, 1985

[54] TELEPHONE CIRCUIT CONTROLLED BY A 2 WIRE - 4 WIRE TRANSMISSION INTEGRATED CIRCUIT MICROPROCESSOR WITH LINE CURRENT EMERGENCY SUPPLY

[75] Inventors: Michel Le Creff; Françoise Guillou; Francois Buhagiar, all of Colombes, France

[73] Assignee: Thomson-CSF Telephone, Colombes, France

[21] Appl. No.: 441,619

[22] Filed: Nov. 15, 1982

[30] Foreign Application Priority Data

Nov. 20, 1981 [FR] France .................. 81 21803

[51] Int. Cl.⁴ ........................................... H04M 1/31
[52] U.S. Cl. ..................... 179/90 R; 179/90 A; 179/90 K; 179/77; 179/81 B
[58] Field of Search ............... 179/90 R, 90 A, 90 K, 179/70, 77, 81 R, 81 B, 16 AA, 16 F, 16 EC, 16 EA, 2 BC

[56] References Cited

U.S. PATENT DOCUMENTS 4,388,499 6/1983 Janssen ..................... 179/90 K X

FOREIGN PATENT DOCUMENTS 2151799 3/1973 France .
2282198 12/1976 France .
2002996 2/1979 United Kingdom ............ 179/2 BC Primary Examiner—Stafford D. Schreyer
Attorney, Agent, or Firm—Roland Plottel

[57] ABSTRACT

The telephone circuit of the invention comprises a transmission circuit short-circuited during decimal numbering by an active circuit when the handset is lifted or during the emission of a decimal numbering digit, the line current supplying, through a voltage stabilizing circuit and a voltage regulation circuit, the microprocessor controlling the telephone circuit.

4 Claims, 5 Drawing Figures

TELEPHONE CIRCUIT CONTROLLED BY A 2 WIRE - 4 WIRE TRANSMISSION INTEGRATED CIRCUIT MICROPROCESSOR WITH LINE CURRENT EMERGENCY SUPPLY

BACKGROUND OF THE INVENTION

(1) FIELD OF THE INVENTION

The present invention relates to a telephone circuit controlled by a 2 wire - 4 wire transmission integrated circuit microprocessor with line current emergency supply.

(2) DESCRIPTION OF THE PRIOR ART

Integrated circuits exist providing the 2 wire - 4 wire transmission function. These inexpensive integrated circuits are provided for sending multi-frequency numbering but not for sending numbering pulses.

SUMMARY OF THE INVENTION

The present invention provides a circuit for using transmission integrated circuits for sending not only the multi-frequency numbering but also pulsed numbering, the microprocessor of this circuit being able to be provided with power not only from the mains but also from the line current.

In the telephone circuit of the present invention, which is controlled by a microprocessor, the 2 wire - 4 wire transmission integrated circuit is supplied with power, from the rectified line voltage, through a line switch which is controlled by a current generator connected in parallel across the transmission circuit, this telephone circuit further comprising: a circuit for reducing its insertion voltage when the handset is lifted for a given duration; a regulated power supply circuit for the microprocessor shunted across the transmission circuit and connected to the electric power mains and comprising a reservoir capacitor; a circuit providing, before decimal numbering, or a recording recall opening, an additional charge for said capacitor; and a capacitor storing the reference voltage of the stabilized power supply of said microprocessor.

BRIEF DESCRIPTION OF THE DRAWINGS

The present invention will be better understood from reading the detailed description of one embodiment given by way of non limiting example and illustrated by the accompanying drawings in which.

DESCRIPTION OF THE PREFERRED EMBODIMENT

Figure 1:
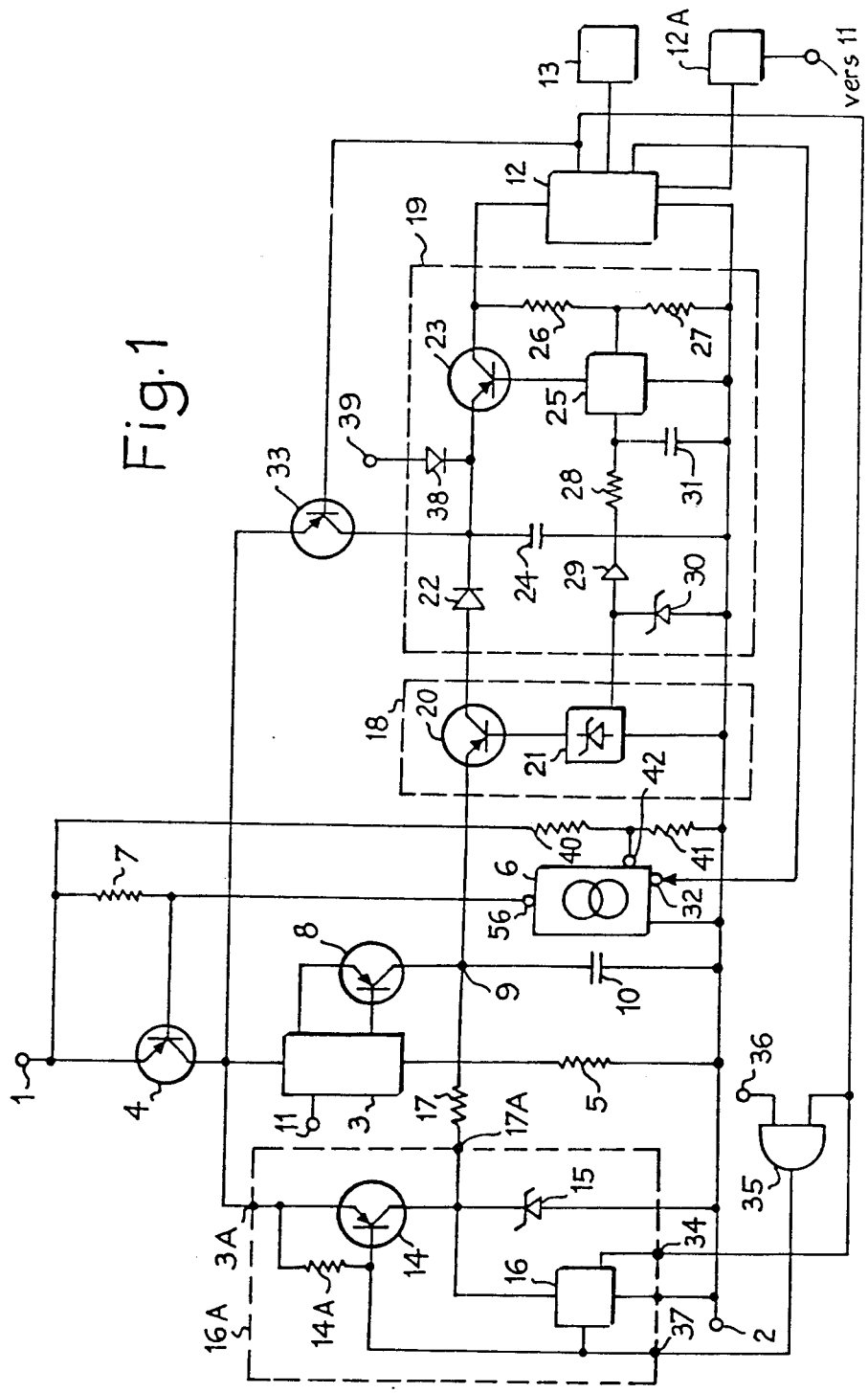
FIG. 1 is a block diagram of a telephone circuit in accordance with the present invention.

The telephone circuit shown in simplified form in FIG. 1 comprises two power supply terminals 1, 2 connected to the output of the rectifier (not shown) of the telephone set or of the terminal in which the telephone circuit described below is fitted. Terminal 1 is connected to the positive pole of the power supply and terminal 2 to the negative pole. The telephone circuit of the invention is constructed around an integrated circuit 3, for example the ITT 1045M circuit. The power supply for the integrated circuit 3 passes, from terminal 1, through the emitter-collector circuit of a PNP transistor 4, through the integrated circuit 3 and through a resistor 5 which is connected to terminal 2. The base of transistor 4 is connected to a current generator 6 and to terminal 1 through a resistor 7. Since the integrated circuit 3 only requires a small current supply and since the line current feeding the telephone circuit may be high, a great part of the current leaving transistor 4 passes through the emitter-collector path of a transistor 8 which is further connected to a terminal 9, the current leaving transistor 8 and passing through terminal 9 serving for supplying a large part of the elements of the circuits described below. Terminal 9 is connected to terminal 2 through a decoupling capacitor 10, of a value of 47 microfarads for example. The input terminal 11 for the multi-frequency signals of the integrated circuit 3 is connected, in a way not shown, to the multi-frequency signal output of a generator circuit 12A, which may for example be the circuit MK 5089, this circuit 12A cooperating with an appropriate microprocessor 12 which may be the circuit TMS 1200C for example, and which is connected to a numbering keyboard 13. Terminal 11 of circuit 3 may also be connected, in a way not shown, to the low frequency output of a "free hand" circuit, and to the output of a monitoring "blip" generator, for example. In this case, these different sources may be connected to terminal 11 through a circuit providing the "OR" function.

The collector of transistor 4 is also connected to a terminal 3A which is itself connected to the emitter of a transistor 14 whose collector is connected via a Zener diode 15 to terminal 2. The base of transistor 14 is connected to terminal 3A through a resistor 14A and to the control output of a monostable circuit 16. The circuit 16 is fed in parallel across the diode 15. The common point between the cathode of the Zener diode 15 and the collector of transistor 14 is connected to a terminal 17A which is itself connected via a resistor 17 to terminal 9. Elements 14 to 16 form a circuit 16A for regulating the insertion voltage.

The voltage existing between terminals 9 and 2 is stabilized by a stabilized power supply circuit 18, then regulated by a regulation circuit 19 for supplying microprocessor 12 and circuit 12A with power.

The voltage stabilization circuit 18 comprises essentially a ballast transistor 20 which is here of the PNP type and whose emitter is connected to terminal 9. The base of transistor 20 is connected to a voltage reference circuit 21. The collector of transistor 20 is connected to the input of the regulation circuit 19 which comprises, from this input, a diode 22 in series with the emitter-collector path of a PNP transistor 23 whose collector is connected to the positive current supply terminal of the microprocessor circuit 12, the negative supply terminal of this circuit 12 being connected directly to terminal 2. Preferably, diode 22 is of the Schottky type having a very low insertion voltage, about 0.2 volt. The common point between the cathode of diode 22 and the emitter of transistor 23 is connected through a reservoir capacitor 24, of very high capacity, for example 1000 microfarads, to terminal 2. The base of transistor 23 is connected to the control output of a conventional comparator circuit 25, one voltage comparison input of which is connected to the output of a resistive divider comprising resistors 26 and 27 coupled between the collector of transistor 23 and terminal 2. The other voltage comparison input of circuit 25 is connected through a resistor 28 and a diode 29 to the cathode of a Zener diode 30 whose anode is connected to terminal 2 and whose cathode is connected to circuit 21. The said other comparison voltage input of circuit 25 is also connected through a capacitor 31 to terminal 2.

The decimal numbering output of circuit 12 is connected to the control input 32 of the current generator 6. The collector of transistor 4 is connected via the emitter-collector path of a PNP type transistor 33 to the emitter of transistor 23. The base of transistor 33 is connected to the decimal numbering train signal output of circuit 12, this output being also connected to a decimal numbering signal train input 34 of circuit 16 and to a first input of an AND function circuit 35 whose other input is connected to a terminal 36. Terminal 36 is connected to a handset inhibition signal output of circuit 12. The output of circuit 35 is connected to the base of transistor 14. The decimal numbering train signal is a signal which is normally at level "0" and which passes to level "1" a little before (about 200 milliseconds) a recording recall opening or the beginning of the loop opening signals of a call decimal numbering digit, and this signal goes back to value "0" a little after (also about 200 milliseconds) the end of the recall opening or of the loop closure signals of this call number digit. This signal is produced, in a way known per se, by circuit 12. This circuit 12 produces also in a way known per se, handset (earphone and microphone) inhibition signals during the whole transmission time of each multi-frequency or decimal numbering digit.

The emitter of transistor 23 is connected to the cathode of a diode 38 whose anode is connected to a terminal 39. Terminal 39 is connected to the positive pole of a stabilized power supply device supplied with current from the electric distribution mains available at the location where the circuit of the invention is disposed. The negative pole of this power supply is connected to terminal 2. The value of the voltage delivered by said stabilizer power supply device is greater by about 1 volt than the stabilized voltage supplied by circuit 18, these voltages having for example as respective values 5 and 4 volts. Thus, as long as the power supply mains has not failed, diode 22 is always disabled and the power supply for circuit 12 is taken from this mains. As soon as the voltage of the mains drops below a certain limit or fails, diode 22 becomes conducting again and circuit 12 is supplied from the telephone line current in the way described below. To allow the line current flow, when the handset is raised, from terminal 1 to terminal 2, transistor 4 must in particular by enabled. For this, a resistance divider 40 and 41 is disposed between terminals 1 and 2, the common point between these two resistors being connected to a current establishing input 42 of the current generator 6.

Figure 2:
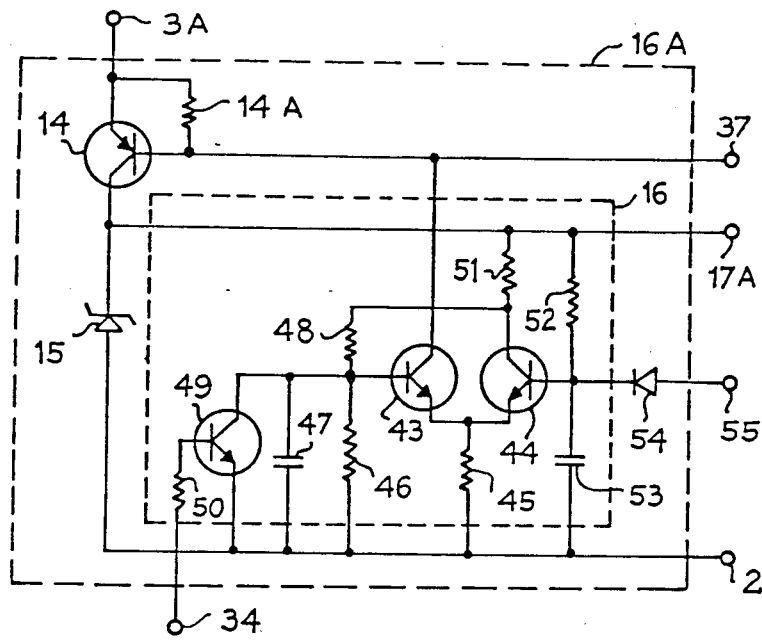
FIGS. 2 to 4 are detailed diagrams of some of the blocks of the circuit of FIG. 1.

There is shown in FIG. 2 one embodiment of the circuit 16A. The monostable circuit 16 comprises essentially two NPN type transistors 43, 44 whose emitters are connected together, the common point between these emitters being connected to terminal 2 through a resistor 45.

The collector of transistor 43 is connected directly to the base of transistor 14. The base of transistor 43 is connected to terminal 2 through a resistor 46 in parallel with a decoupling capacitor 47, and this base is also connected to the collector of transistor 44 through a resistor 48 and to the collector of a NPN type transistor 49. The emitter of transistor 49 is connected to terminal 2 and its base is connected through a resistor 50 to terminal 34. The collector of transistor 44 is connected through a resistor 51 to terminal 17A and its base is connected, on the one hand, through a resisitor 52 to terminal 17A and, on the other hand, through a capacitor 53 to terminal 2, and finally to the cathode of a diode 54 whose anode is connected to a terminal 55. As described below, terminal 55 is connected to a current source of the stabilized power supply.

In the monostable 16 of circuit 16A described above, resistor 52 and capacitor 53 determine the duration of the pulse delivered by the monostable to the base of transistor 14 from the time when the voltage at the base of transistor 44 reaches a trigger threshold, which is in the present case about 2.5 volts. This trigger threshold is determined by resistors 46, 48 and 51 from the voltage existing at the terminals of the Zener diode 15, whose Zener voltage is 4 volts according to one embodiment. When a call is received by the telephone circuit of the invention, as soon as the subscriber lifts the handset, the line current may begin to flow from terminal 1 to terminal 2 because transistor 4 is saturated and transistor 8 begins to deliver. The effect of this line current is first of all principally to begin to charge the decoupling capacitor 10 and to pass into resistor 17 for charging capacitor 47, whose value is substantially less than that of capacitor 53. Resistors 51 and 48 are determined so that the sum of their values is substantially less than the value of resistor 52. Thus, transistor 43 will begin to be enabled before transistor 44. During the duration of the pulse supplied by monostable 16, transistor 44 is disabled and transistor 43 is enabled, which means that transistor 14 is conducting and a part of the line current passes therethrough, which causes the voltage to drop between terminals 1 and 2. When transistor 44 begins to conduct, following an increase in the voltage at the terminals of capacitor 53 which is charged more slowly than capacitor 47, transistor 43 is disabled, because the voltage at its base drops below said threshold, which results in the disabling of transistor 14 and so the end of the pulse supplied by monostable 16. At the end of this pulse, the line current can no longer flow into circuit 16A, which causes the voltage between terminals 1 and 2 to rise again slightly. In one embodiment, the voltage between terminals 1 and 2 is less than 6 volts during the duration of the pulse from monostable 16, and rises again to a value slightly less than 8 volts at the end of this pulse whose duration is about 1 second. Consequently, the insertion voltage which the telephone circuit of the invention presents is less than a determined value, in the present case 6 volts, for a short time after the handset has been lifted, which means that the automatic switch to which the telephone set in question is connected may take into account the lifting of the handset (loop closure) even if the line which connects the automatic switch to the telephone set is of a great length.

Figure 3:
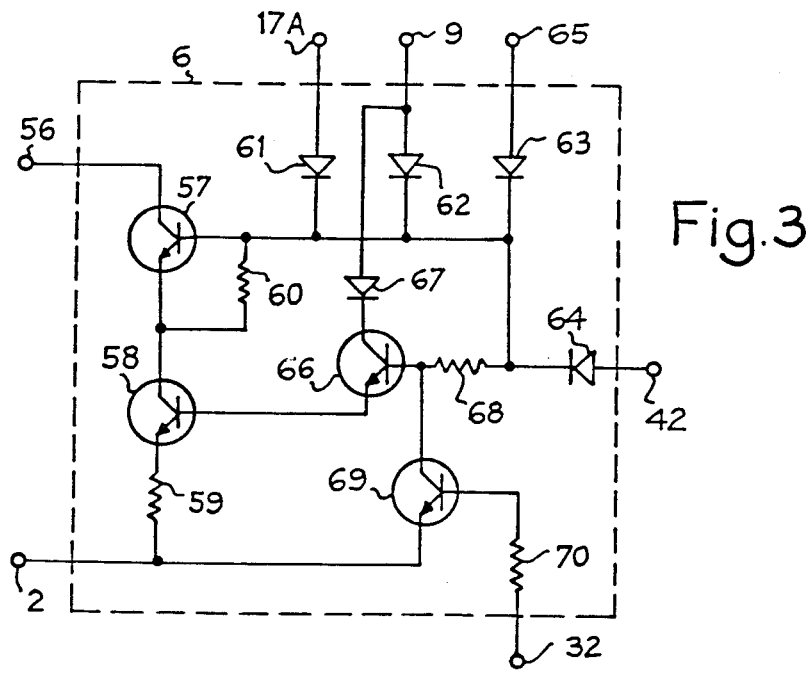

In FIG. 3 there is shown the diagram of circuit 6 supplying the base of transistor 4. Because this circuit 6 is in parallel across the transmission circuit 3, it must not affect the impedance thereof and must therefore behave like a current generator.

Circuit 6 comprises a terminal 56 connected directly to the base of transistor 4. Circuit 6 comprises between terminal 56 and terminal 2 a series circuit comprising respectively the collector-emitter circuits of two NPN type transistors 57, 58 and a resistor 59. The base of transistor 57 is connected to its emitter through a resistor 60. The base of transistor 57 is also connected to the cathodes of four diodes referenced respectively 61 to 64. The anodes of diodes 61 to 64 are connected respectively to the terminals 17A, 9, 65 and 42, terminal 65 being connected to the positive pole of the current supply source (not shown) of the microprocessor 12. The base of transistor 58 is connected to the emitter of a NPN transistor 66 whose collector is connected to the cathode of a diode 67, the anode of this diode being connected to terminal 9. The base of transistor 66 is connected, on the one hand, through a resistor 68 to the base of transistor 57 and on the other hand to the collector of a NPN transistor 69 whose emitter is connected to terminal 2 and whose base is connected through a resistor 70 to terminal 32.

Resistors 40 and 41, connected to terminal 42, allow the base current of transistors 66, 58 and 57 to be established and so the current between the terminals 56 and 2 to be established, within circuit 6, which enables transistor 4 and allows the current to be established in the transmission circuit 3. The base current of transistor 4 is determined by the value of resistor 59. Diodes 61 to 63 form a logic OR for supplying the bases of transistors 57 and 66 under all circumstances, that is to say not only during conversation (diode 62), but also during the starting up cycle when the handset is lifted (diode 61) and also during decimal numering (diode 63). Since terminal 32 is connected to the decimal numbering signal output of the microprocessor circuit 12, these numbering signals enable and disable successively transistor 69 as well as transistors 66 and 58 and so transistor 4. The succession of the enabled and disabled states of transistor 4 is interpreted by the automatic switch in question as a series of loop openings and closures.

Figure 4:
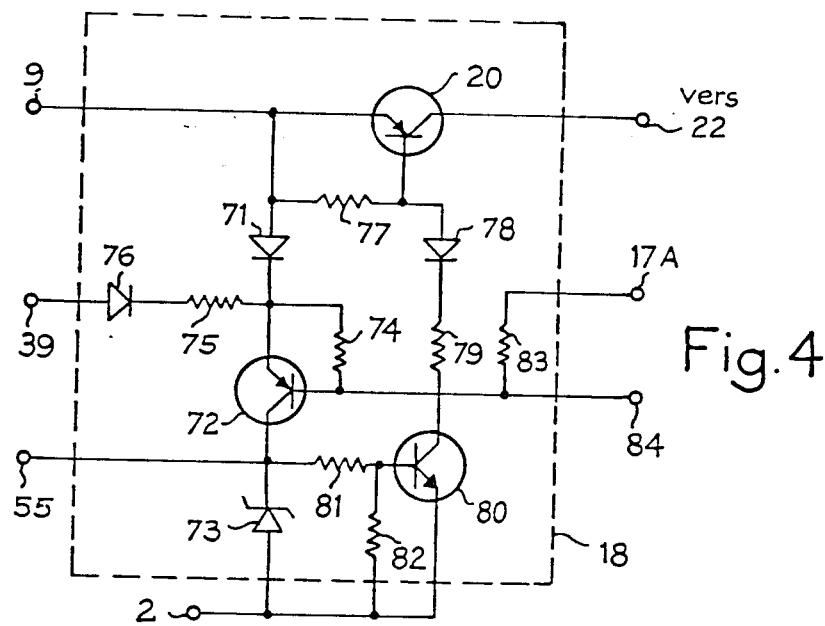

In FIG. 4 there is shown one embodiment of the voltage stabilizing circuit 18. The emitter of transistor 20 is connected to terminal 2 through a series circuit comprising respectively a diode 71, the emitter-collector circuit of a PNP transistor 72, and a Zener diode 73 whose anode is connected to terminal 2. the base of transistor 72 is connected to its emitter through a resistor 74. The emitter of transistor 72 is connected, on the one hand, through a resistor 75 to the cathode of a diode 76 whose anode is connected to terminal 39, this terminal 39 being connected as mentioned above to the anode of diode 38 (see FIG. 1). The base of transistor 20 is connected to its emitter through a resistor 77. The base of transistor 20 is connected to terminal 2 through a series circuit comprising a forwardly connected diode 78, a resistor 79 and the collector-emitter circuit of a NPN transistor 80. The base of transistor 80 is connected to the cathode of the Zener diode 73 through a resistor 81 and to terminal 2 through a resistor 82. The base of transistor 72 is connected via a resistor 83 to terminal 17a and to a terminal 84, which is itself connected to the cathode of the Zener diode 30.

In the voltage stabilizing circuit 18, resistors 81 and 82 are determined so that transistor 80 is enabled when the voltage at the terminals of the Zener diode 73 reaches the value of the Zener voltage of this diode. This Zener voltage is reached when the voltage between terminals 9 and 2 reaches its nominal value which is, in one embodiment, 4 volts. When transistor 80 is conducting, transistor 20 is also conducting and the line current may also supply the microprocessor 12 through diode 22 and transistor 23. Still in the same embodiment, the voltage between the collector of transistor 23 and terminal 2, i.e. the supply voltage for microprocessor 12 is 3.2 volts, the voltage at the terminals of the reservoir capacitor 24 being then about 3.8 volts. Thus, as long as the voltage between terminals 9 and 2 is below its nominal value, transistor 20 is disabled and if the mains voltage supplying terminal 39 fails, microprocessor 12 cannot be supplied by the line current. To prevent, in this case, any incorrect operation of the microprocessor when its supply voltage is re-established, a resetting circuit may be provided effecting re-setting of its program and of its random access memories when the supply voltage is re-established, the construction of such a re-setting circuit being obvious for a man skilled in the art. The emitter of transistor 72 may receive current not only from terminal 9 (line current) through diode 71 but also from terminal 39 (mains supply) through diode 76. With the cathode of the Zener diode 73 connected to terminal 55 (see FIG. 2), the current leaving the collector of transistor 72 may also serve for rapidly charging the capacitor 53 of monostable 16 after each train of decimal numbering signals, so as not to cause the monostable 16 to switch inopportunely at the end of a numbering signal train so as not to enable transistor 14 after each numbering signal train.

Since, in the absence of mains voltage, the reservoir capacitor 24 can only fully play its role if it is sufficiently charged, and since this capacitor discharges during the transmission of decimal numbering digits (loop openings cutting off the line current), the present invention provides an additional charge for this reservoir capacitor just before a recording recall opening or the emission of a digit or during the interdigit interval in decimal numbering. The device providing this additional charge is formed by transistor 33 which is enabled by the above mentioned decimal numbering train signals coming from the microprocessor 12. Since, as was stated above, these signals pass to state "1" about 200 milliseconds before a recall opening or the first loop opening, transistor 14 is enabled before the recall opening or the first loop opening, which allows capacitor 24 to be charged to a voltage higher than the voltage normally existing at its terminals before the recall opening or the first loop opening. In said embodiment, the normal voltage at the terminals of capacitor 24 is 3.8 volts and just before the first loop opening, the voltage at the terminals of capacitor 24 reaches about 7 volts. At each loop opening, capacitor 24 is slightly discharged to supply the microprocessor 12 in the absence of mains supply voltage, and at the end of a digit the voltage at the terminals of the capacitor practically resumes its nominal value. Since said decimal numbering train signal only goes over again to state "0" about 200 milliseconds after the last loop opening of a digit, capacitor 24 may receive an additional charge between the last loop opening and the time when the decimal numbering train signal goes over again to "0". Similarly, capacitor 24 may receive an additional charge before a recall opening.

The insertion voltage of the above-described circuit passes over to a lower value which is for the above-mentioned embodiment, about 6 volts, at the moment when the handset is lifted and during the emission of each digit of the decimal numbering. In this latter case, transistor 14 is enabled by the signal present at the output of the AND function circuit 35. Circuit 35 receives from the microprocessor 12 two signals: on the one hand, loop opening signals going over to level "1" at each loop opening and, on the other hand, at terminal 36, a handset inhibition signal normally at state "0" and passing to "1" during the whole emission time of a decimal numbering digit. Consequently, transistor 14 is enabled during the whole emission time of each decimal numbering digit. Thus, the insertion voltage of the telephone circuit is at its minimum value during the emission of each digit and the automatic switch in question may correctly take into account all the digits emitted, even if the connection lines between the automatic switch and the subscribers set are very long.

Figure 5:
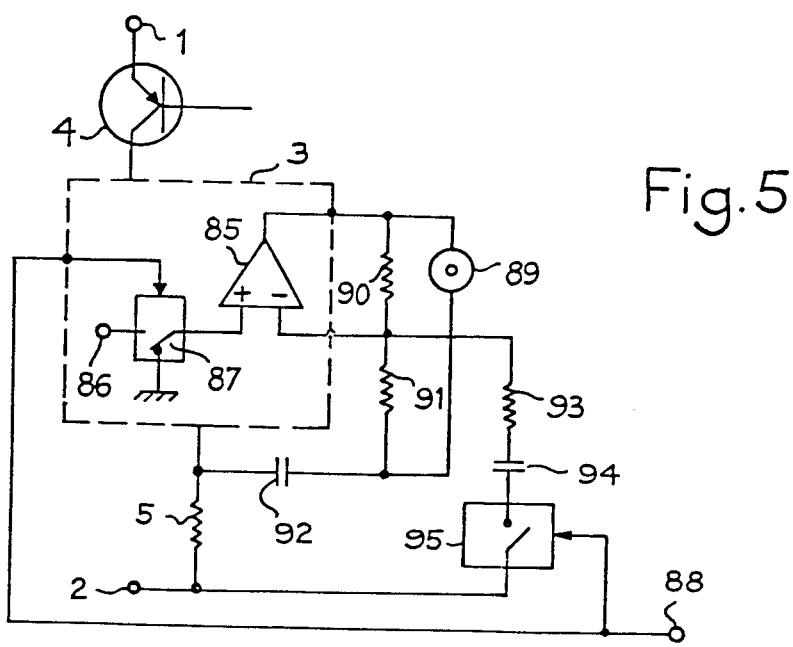
FIG. 5 is a simplified diagram of a monitoring circuit for the circuit of FIG. 1.

There is shown schematically in FIG. 5 a circuit for monitoring the numbering signals produced by the circuit of the invention. In this figure, only the elements of the circuit of FIG. 1 necessary for understanding the monitoring circuit have been shown. The integrated circuit 3 comprises, among others, an operational amplifier circuit 85 one of whose inputs is connected, internally, to a terminal 86 through an inhibition circuit 87 whose control is connected, externally of circuit 3, to a terminal 88 which is itself connected, in a way not shown, to a handset inhibition signal output of the microprocessor 12. The earphone 89 of the handset of the telephone set is connected between the common point between resistor 91 and capacitor 92 and the output of amplifier 85, a feedback resistor 90 being connected in a conventional way. Said other input of circuit 85 is also connected through a resistor 91 in series with a capacitor 92 to the output of circuit 3 which is connected to resistor 5. The common point between resistor 90 and resistor 91 is connected to terminal 2 through a series circuit comprising a resistor 93 whose value is substantially greater than the impedance of the earphone, an insulating capacitor 94 and a controlled switch 95 whose control terminal is connected to terminal 88.

In the decimal or multi-frequency numbering phase, a residual portion of the numbering signal is present at the terminals of resistor 5 and inhibition of the handset is total following the inhibition signal fed by the microprocessor 12 to terminal 88. To monitor the numbering signals, it is then necessary to re-inject a small part of the numbering signal into the earphone circuit. To effect this re-injection, the negative input of the earphone amplifier 85 is connected through a high resistance 93 to the common potential of terminal 2.

If it is desired to use an amplified listening circuit, a differential amplifier (not shown) is used whose inputs are connected to the terminals of the earphone, the output signal being taken between terminal 2 and the output of this differential amplifier. If it is desired to use an anti-Larsen device from the microphone signal, the inputs of another differential amplifier are connected to the terminals of the microphone and the output signal is taken between the output of this differential amplifier and terminal 2.

What is claimed is:

1. A telephone circuit for pulse dialing by way of multifrequency responsive transmission circuitry, comprising:
    a 2 wire-4 wire transmission integrated circuit connected in series with a switching element between a first and a second terminal,
    a circuit for reducing the telephone circuit insertion voltage, when the handset is lifted, for a given duration of time, this reducing circuit being connected across the 2 wire-4 wire transmission circuit,
    a telephone microprocessor circuit (12) connected to a keyboard and to a multifrequency generator for producing both decimal numbering pulses or multifrequency numbering signals, this microprocessor circuit being connected through a voltage stabilizing circuit, a normally (i.e. when mains present at 39) backward biased diode (22), and a regulated supply circuit to said second terminal (2) and to a third terminal (9) which is itself connected through a semiconductor (8) controlled by the 2 wire-4 wire transmission circuit to a fourth terminal (collector of 4) itself connected to said transmission circuit and to said switching element, said voltage regulator being connected through a diode (38) to an independent power supply, said regulated supply circuit comprising a reservoir capacitor,
    a current generator connected between said second terminal and the output of a voltage divider connected itself between said first and second terminals, the output (56) of the current generator being connected to the control input of said switching element (4), this current generator being controlled by the decimal numbering pulses produced by said microprocessor circuit, and
    a semiconductor (33) connected in series with said reservoir capacitor between said forth and second terminals, and controlled by said microprocessor for turning it on shortly before the emission of a decimal numbering digit or a recall opening and turning it off shortly after this emission or this recall opening.

2. The telephone circuit as claimed in claim 1, wherein said circuit for reducing its insertion voltage comprises a series circuit formed from the emitter-collector path of a transistor in series with a Zener diode, this series circuit being connected in parallel across the transmission circuit and its load impedance, said transistor being controlled by a monostable circuit whose trigger input is connected to a circuit receiving a part of the line current as well as to an output of the microprocessor activated shortly before the emission of a decimal numbering digit and de-activated shortly after the end of this emission.

3. The telephone circuit as claimed in claim 1, wherein said regulated supply circuit comprises a capacitor storing its reference voltage.

4. The telephone circuit as claimed in claim 1, wherein a numbering monitoring circuit is provided comprising a series circuit formed of a high value resistor, an insulating capacitor and a controlled switch whose control input is connected to a handset inhibiting output of the microprocessor, this series circuit connecting one of the inputs of an earphone amplifier circuit in said second terminal.

* * * * *